United States Patent [19]

Wargin

[11] Patent Number: 4,539,240

[45] Date of Patent: Sep. 3, 1985

[54] ASBESTOS FREE FRICTION ELEMENT

[75] Inventor: Robert V. Wargin, Sao Paulo, Brazil

[73] Assignee: Borg-Warner Corporation, Chicago, Ill.

[21] Appl. No.: 676,144

[22] Filed: Nov. 29, 1984

[51] Int. Cl.$^3$ ................................................ B32B 3/02
[52] U.S. Cl. ........................................ 428/64; 57/238; 57/240; 192/107 M; 428/222; 428/292; 428/294; 428/377
[58] Field of Search ................. 57/237, 238, 239, 240; 428/375, 377, 432, 379, 64, 292, 294; 192/107 M; 428/222

[56] References Cited

U.S. PATENT DOCUMENTS 3,756,910 9/1973 Peters et al. ........................ 428/222
3,967,037 6/1976 Marzocchi et al. .................. 428/375

Primary Examiner—James J. Bell
Attorney, Agent, or Firm—R. J. Schlott

[57] ABSTRACT

Friction elements, particularly those employed in clutch elements, which incorporate fiber strands impregnated with a binder resin wound into a friction element and cured are markedly improved in wear characteristics and burst strength when the fiber strands are formed of a combination of glass, acrylic fiber and metallic filament. The fiber strands, twisted into a yarn and plied to form a composite yarn of opposing twist, contribute greatly to improved performance, particularly better fade resistance and engagement response, together with high burst strength.

5 Claims, No Drawings

4,539,240

ASBESTOS FREE FRICTION ELEMENT

BACKGROUND OF THE INVENTION

This invention relates to an improved composition for use in forming shaped friction elements such as clutch facings and the like. More particularly, the invention relates to friction elements incorporating a specific combination of fibers in the form of twisted and plied yarns which provides improved friction characteristics and burst strengths. Such friction elements possess properties comparable with known friction elements yet, consonant with the increased demand to protect the environment against exposure to airborne substances that are deleterious to health, eliminates asbestos as the conventional component of such friction elements.

The mineral asbestos has been long associated with the manufacture of articles whose use requires that they withstand heat. Cloth woven from the fibrous substance was known, even in the 12th century, to remain incombustible when thrown into fire. It is not surprising, therefore, that asbestos has been the major component of friction elements such as those used in the brake and clutch assemblies of automotive vehicles where severe operating temperatures and pressures must be withstood. For more than 50 years, asbestos dominated as the principal active friction ingredient in friction materials.

When the asbestos used in friction elements is in the form of a yarn, the yarn is commonly provided with a core of fine metal wire to provide the tensile strength needed in handling the yarn during fabrication of a friction element. Asbestos fibers are commonly reinforced with a stronger fibrous substance such as cotton in order to spin the asbestos into a yarn. The introduction of cotton or some other fiber into the asbestos was to improve its spinability or the tensile strength of the yarn, and thus the addition was to be tolerated rather than encouraged. The need for including a limited amount of other fibers such as cotton in asbestos yarn intended for use in friction elements has become so well accepted that in recent years, such yarns are commonly described only as "asbestos yarn" without specifically mentioning such other fibers.

Since the passage of the Occupational Safety and Health Act of 1970, the standards for occupational exposure to asbestos have become increasingly rigid to the point where zero exposure may be required. The imposition of such standards was brought about by evidence that exposure to asbestos may be carcinogenic to man. It is thus a worthy (and perhaps in the future a mandatory) objective to eliminate asbestos as a component of friction materials.

The use of glass fibers in friction products has been suggested. Some of the earlier of these suggestions involved the use of glass fibers to reinforce asbestos-containing friction elements, first as backing materials for conventionally produced friction elements and then as part of the friction facing itself. The stated purpose for the use of glass fibers was to increase the burst strength of the friction elements (Burst strength is an index of the centrifugal forces which can be withstood by a friction element without disintegrating. The test of burst strength is usually carried out at elevated temperatures).

More recently, it has been suggested that glass fibers alone or together with metal wire or chips may be used to form friction elements containing no asbestos, as shown for example in U.S. Pat. Nos. 3,756,910 and 3,967,037. The glass fibers are said not only to improve burst stength and wear-resistance, particularly at elevated temperatures, but also to serve as the active friction ingredient. Generally, such friction elements are fabricated by known techniques using a conventional, heat-curable organic binder to bond the glass fibers together in a mass.

It has been stated that glass, as the active friction ingredient of a friction element, is too "aggressive" in most commercial applications in comparison with conventional asbestos-containing friction facings. This aggressiveness is often manifested during simulated or actual operating conditions as noise, vibration and/or erratic friction effects when the friction element is engaged with a mating surface, none of which manifestations can be tolerated by the highly-competitive automotive industry. One method for overcoming this aggressiveness is disclosed in U.S. Pat. No. 4,418,115, describing the use of a combination of glass fibers and acrylic or modacrylic fibers.

A variety of other methods for improving or modifying the friction and/or wear characteristics of asbestos-free friction materials are also known and further methods for modifying the properties of asbestos-free friction compositions are constantly being sought to widen the commercial applications for such materials.

SUMMARY OF THE INVENTION

A composition for use in forming an improved asbestos-free friction element is comprised of organic fiber, metallic filaments and glass fiber reinforcing constituents, and a cross-linkable polymeric binder. The organic fiber, metallic filaments and glass fiber are formed into a plied yarn before being impregnated with the binder resin and winding into a clutch element. The binder, when cross-linked, forms a matrix for the glass fibers, metallic filaments and organic fibers in the friction element.

DETAILED DESCRIPTION OF THE INVENTION

The cross-linkable polymeric binder useful in the practice of the invention is that usually employed in friction elements and referred to as "binder" or "binder cement".

The binder contains a cross-linkable or curable resin such as a phenolic resin. The term "phenolic resin", as used herein, is intended to mean and include thermosetting resins based on the condensation of an aldehyde and a phenol. The aldehydes useful in forming the phenolic resins are, but not limited to, formaldehyde, acetaldehyde, acrolein, and the like. The phenols useful in forming the phenolic resin are those phenols capable of electrophilic aromatic substitution; for example, phenol, resorcinol, catechol, aminophenol, and the like. Both the resole and novalac type phenolic aldehyde resins are contemplated to be within the scope of the term "phenolic resin". The resole resins are characterized by their formation with base catalysis and the novalac resins are characterized by their formation with acid catalysis. Generally, the resole resins are more highly methylolated than the novalacs. The choice between the resole and the novolac resin in a particular system is contingent on the other materials present in the system. In the binder, phenol formadehyde novalac resins are among the most commonly used and preferred.

In addition to the phenolic resin the binder cement may and usually does contain an elastomer, such as a natural or synthetic rubber. "Synthetic rubber" as used herein is intended to mean and include the hydrocarbon chain rubbers which are based upon a diene monomer. The diene monomers which are used in the preparation of suitable synthetic rubbers include chloroprene, butadiene, isoprene, cyclopentadiene, dicyclopentadiene and the like. Other olefins capable of free radical, anionic, or cationic interpolymerization with the conjugated unsaturated monomer are useful in forming the synthetic rubbers. These olefins include the acrylic monomers such as methacrylic acid, acrylic acid, acrylonitrile, methacrylonitrile, methyl methacrylate, methylacrylate, ethylacrylate, ethylmethacrylate and the like; mono-olefinic hydrocarbons such as ethylene, propylene, styrene, alphamethylstyrene and the like; and other functional monounsaturated monomers such as vinyl pyridine, vinyl pyrrolidone and the like functional vinylic monomers. Also within the scope of the term synthetic rubber are the non-hydrocarbon chain rubbers such as silicone rubbers. In selecting an elastomer for use in the binder composition, care should be taken to ensure that the chemical composition of the particular elastomer does not interfere with the functioning or lifetime of the friction element and apparatii associated therewith.

In addition to the polymeric constituents of the binder, other known materials for forming binders may be used. For example, vulcanizing agents may be added to the binder to cross-link the unsaturated rubbers. Exemplary of such vulcanizing agents are sulphur, zinc oxide (for vulcanizing neoprene), peroxides, dinitrosobenzene and the like. Vulcanization accelerators may be used such as zinc oxide, stearic acid and the like. Polyamines may also be added to the binder to promote the cross-linking and interraction of the phenolic resin and the elastomer. Typical polyamines are hexamethylene tetraamine, diethylene triamine, tetraethylene pentamine, diphenylguanidine and the like.

Fillers may be added to the binder to modify the final physical properties and reduce the expense of the friction element. Common fillers including carbon black, clay, graphite, lead sulphate, aluminum silicate, wollastonite rottenstone, mica, lime, gypsum and the like may be used. A wide variety of commercial phenolic resins and phenolic binder compositions are readily available commercially. Such resins may be employed as obtained or be further modified by addition of one or more of the aforementioned materials to provide binder resins suitable for use in the practice of this invention.

Typically, the binder composition with all attendant ingredients is dissolved and/or dispersed in a solvent for the soluble polymeric constituents. Sufficient solvent is provided to obtain the proper binder solution/dispersion viscosity for combination with the glass and the organic fiber to obtain the proper ratio of binder to reinforcing constituents. The infusible organic fibers and the glass fibers taken together are preferably present in the range of 20 to 75 percent by weight based on the total weight of the final friction element and more preferably in the range of 30 to 65 percent by weight. If the level of organic, metallic and glass components is too low, inadequate reinforcement of the friction element will result. If the level of fibers is too high, excessive wear will be demonstrated by the friction element.

The glass fibers useful in the practice of the invention are those typically utilized for reinforcing cured resinous materials. The glass fiber surface must be treated with a bridging composition to effectively bond (chemically and/or physically) the glass to the matrix of the friction element.

During formation, the individual glass filaments are treated with a size which contains a coupling agent that links the glass surface to the matrix. These coupling agents include both the silane coupling agents and the Werner complex type coupling agents. Typical silane coupling agents are the vinyl, alkyl, betachloropropyl, phenyl, thio-alkyl, thio-alkaryl, methacrylate, epoxy, and mercaptosilanes, their hydrolysis products, polymers of their hydrolysis products and mixtures of any of these. Werner type coupling agents are those which contain a trivalent nuclear atom such as chromium, coordinated with an organic acid such as methacrylic acid. Such agents are well-known in the art and are commercially available. Glass filaments are also widely available commercially having been sized during the manufacture, and these filaments are suitable for use in the practice of this invention.

The physical form of the glass fibers may vary according to the particular method of fabricating the friction element. Thus, fiber glass in the form of strand, yarn, roving or the like may be used in forming the friction element. Preferably, in the fabrication of clutch facings, the glass fibers are in continuous form and sized to improve the burst strength of the friction element while, at the same time, permitting convenient friction element fabrication techniques.

The organic fibers useful in the practice of the invention are those generally described as acrylic fibers, including modacrylic fibers. These fibers are widely available commercially in the form of staple fiber and yarn. The metallic filament may be formed of copper or copper alloy such as brass or bronze.

The proportion of acrylic fiber, glass fiber and metallic filament employed and their combination into a twisted yarn are important to achieving good frictional properties and burst strength. In the practice of this invention the fibers are formed into a twisted composite yarn. For example, the fiber glass component may first be formed into a yarn having a left-handed or "z" twist. The z-twisted glass yarn may then be combined with the requisite acrylic yarn and metallic filament and plied to form a yarn having a right-handed or "s" twist. It will be apparent that the first yarn may have an "s" twist and the final yarn a "z" twist, the essential feature being that the final structure is formed by plying the twisted yarns in the opposite helical direction from the helical twist of the twisted yarns. A variety of alternatives exist, including for example combining the fiber glass and acrylic components into a z-twisted yarn, followed by plying a plurality of these composite yarns with the metallic filament into an s-twisted cabled yarn, or z-twisting fiberglass, acrylic and copper wire together to form a yarn, then s-twisting two or more of these yarns to form a plied or cabled yarn. The proportion of metallic filament, acrylic yarn and glass fiber in the cabled composite yarn or cord will vary from about 30 to about 70 wt. % glass fiber, from about 15 to about 25 wt. % acrylic yarn and from about 45 to about 15 wt. % metallic filament.

In addition to improving the performance of friction elements, many combinations of glass and acrylic fibers and metallic filament reduce the weight of the friction element, improve responsiveness during engagement, increase fade resistance at high temperatures, and provide high burst strength.

Friction elements embodying the present invention may be fabricated in accordance with procedures known to those skilled in the art. In general, the cabled yarns are impregnated with the formulated cross-linkable polymeric binder solution to form an impregnant. The binder solution should be of sufficiently low viscosity to wet the fibers. The impregnant is dried by evaporating the binder solvent to form a "B" stage. The B stage composition is molded under heat and pressure to cross-link the cross-linkable polymeric binder. The molded article may then be machined into its final form.

One commonly used technique for forming friction elements, and especially clutch facings, is to construct a preform. A "preform" is a loosely structured article in the B stage, composed of woven or wound reinforcing constituents impregnated with a cross-linkable binder, which roughly resembles the configuration of the final friction element. The preform is molded under heat and pressure to give it a final shape and cross-link the binder.

One particular method for constructing a preform involves the formation of a tape composed of one or more continuous strands of cabled yarn arranged in parallel relationship and impregnated with binder and cured to a B stage. The continuous cabled yarns of fibrous material are passed through a dip tank containing the cross-linkable organic binder solution which is adjusted to a viscosity sufficient to provide for adequate impregnation of the fibrous components and pickup of the binder. The proper binder pickup is adjusted by a die, and the impregnant is passed through a drying tower maintained at a temperature sufficient to evaporate the solvent of the binder solution to form a B stage. The B stage impregnant is stored in drums for further processing.

In fabricating a preform, one or more B stage impregnated tapes are wound in an undulating manner to a revolving mandrel using methods conventional in the clutch-facing art, to produce a preform of the desired size, shape and weight. The preform is subjected to heat and pressure to produce a cured friction element according to methods well known in the art.

A particular advantage of the present invention is that it provides a composition for preparing friction elements by using existing commercial practices and equipment.

The following is a specific embodiment of the present invention; however, the invention is not to be construed as being limited to this embodiment for there are numerous possible variations and modifications.

Preparation of Composite Cord

EXAMPLE 1

Fiberglass roving formed of H glass (type E) filament having a silone coupling agent and having a weight of tex 200 (200 g/1000 meters) was given a left-hand or z-twist of approximately 70 turns per meter. Four z-twisted rovings were then combined with two acrylic yarns and two copper filaments, each of about 8 mil diameter, and plied with a right-handed or s-twist at approximately 70 turns per meter to provide a composite cord comprising 47.3 wt. % fiberglass, 17.5 wt. % acrylic yarn and 35.2 wt. % copper filament.

EXAMPLE 2

Two fiberglass rovings formed of H glass (type E) filament and having a weight of tex 200 were combined with 1 acrylic yarn and 1 copper filament (approximately 8 mil) and given a left hand z-twist of approximately 70 turns per meter. Two of these z-twisted yarns were then combined and plied into a composite cord having a right-handed or s-twist of about 70 turns per meter.

Impregnating and Clutch Plate Preparation

EXAMPLE 3

Four composite cords prepared as in Example 1 were impregnated with a conventional phenolic binder resin solution comprising 25.7 wt. % phenolic resin, 24.9% rubber and rubber accelerators, 15.5 wt. % sulfur, 5.5 wt. % carbon and 28.4 wt. % fillers.

A tape was formed by gathering the four composite cords together into a flat parallel configuration, passing the cords through a dip tank containing the binder resin, then through a drying oven maintained at 80° C. The resin pick-up was approximately 38.5 wt. %, based on total weight of the resin-coated tape. Preforms were prepared in the conventional manner by winding the tape in an undulating fashion onto a revolving mandrel. The preforms were then molded in a clutch facing mold at 5000 psi and 160° C. for 3¼ mins., and cured at 180260° C. for 7½ hours to provide clutch plates for testing.

EXAMPLE 4

Four composite cords of Example 2 are similarly impregnated, formed into a tape, wound into a preform, molded and cured as in Example 3 to provide clutch plates for testing.

Control Examples A–E

A variety of cabled yarns, prepared by substantially the same method employed in Example 1, were formed into clutch facings using the procedures of Example 3. The cabled yarns of these control examples, together with clutch performance test data, are summarized in Table I.

The clutch plates were assembled into clutch assemblies for dynamometer testing to determine friction and wear characteristics. The fade characteristics were measured in a standard Krauss testing machine, and burst strength were determined in a centrifugal burst machine to establish the rotational speed at burst for elevated (500° F.) temperatures. These test data are summarized in Table I.

TABLE I

| Ex No | Cord Comp | Ave Wear | Fade °C. | Max °C. | Burst rpm |
|---|---|---|---|---|---|
| 3 | 4 gl/2Ac/2 cu | 0.0130 | 410 | 460 | 10,688 |
| 4 | 4 gl/2Ac/2 cu | 0.012 | 350 | 450 | 13,292 |
| A | 6 gl/2Ac/2 cu | 0.021 | 300 | 350 | 9,000 |
| B | 4 gl/2Ac/1 cu | 0.0186 | 310 | 350 | 9,600 |
| C | 4 gl/2Ct/2 cu | — | 450 | 510 | 11,070 |
| D | 6 gl/2 Rayon/2 cu | 0.0204 | 310 | 340 | 9,250 |
| E | 4 gl/2 Rayon/2 cu | 0.015 | 270 | 330 | 9,565 |

Notes:
Cord Comp: Composition of cabled yarn; gl = glass filament, Ac = acrylic yarn, ct = cotton yarn, cu = copper filament. Fade, Fade Max = Krauss data, fourth cycle. Burst = rpm at burst, 232 mm diameter clutch facings.

It will be apparent from these data that the burst strengths of facings are substantial when cabled composite yarns are employed in their manufacture according to the practice of this invention. The form of yarn fabrication contributes further to the burst strength, as shown by a comparison of Examples 3 and 4. It will also be seen that a reduction in the copper content, Control B, or an increase in glass content, Control A affects fade resistance and wear properties. When assembled into a clutch, installed into a Ford Escort automobile and run on a test track, clutch plates prepared substantially as in Example 3 exhibited substantially less aggressiveness as determined by pressure plate wear, compared with clutch plates prepared from glass fiber and rayon yarn.

The invention will thus be seen to be an improved friction element which includes a resin binder and a plurality of fiber strands wherein the fiber strands are in the form of a plied yarn comprising from 30 to 70 wt. % glass fiber, from 15 to 25 wt. % acrylic fiber and from 15 to 45 wt. % metallic filament. Preferably, the plied yarn is formed from a plurality of twisted yarns, each having a helical twist of from 50 to 120 turns per meter in the same direction, the twisted yarns being formed into a plied yarn having a helical twist of from 50 to 120 turns per meter opposite in direction to the twist direction of the twisted yarns. The plied yarn may be made up entirely of twisted yarns formed of metallic, acrylic and glass components, or of a combination of twisted yarns and metallic and/or acrylic fibers. The friction elements of this invention exhibit markedly improved strength, fade resistance and wear characteristics over similar structures formed from other fiber combinations. These skilled in the art will recognize that the non-limiting examples are provided by way of illustration and it will be apparent that many further variations may be made, particularly in the use of fillers, friction-modifying additives, alternative resin binder compositions and the like, and that the compositions of this invention may be further adapted for use in producing a variety of friction elements without departing from the spirit and scope of the invention.

I claim:

1. In a friction element adapted for use in a clutch, said friction element comprising fiber strands impregnated with a binder resin composition and disposed in an undulating fashion and then cured to form a disc-shaped facing, the improvement wherein said fiber strands are in the form of a plied yarn comprising from about 30 to about 70 wt. % glass fiber, from about 15 to about 25 wt. % acrylic fiber and from about 15 to about 45 wt. % metallic filament.

2. In the friction element of claim 1, the improvement wherein said plied yarn comprises a plurality of twisted yarns, said twisted yarns having a helical twist of from 50 to 120 turns per meter and said plied yarn having a helical twist of from 50 to 120 turns per meter opposite in direction to the twist direction of the twisted yarns.

3. In the friction element of claim 1, the improvement wherein said plied yarn comprises at least two twisted yarns having a helical twist of from 50 to 120 turns per meter and at least one copper wire, said plied yarn having a helical twist of from 50 to 120 turns per meter opposite in direction to the twist direction of the twisted yarns.

4. A plied yarn adapted for use in the manufacture of friction elements, said plied yarn comprising from about 30 to about 70 wt. % glass fiber, from about 15 to about 25 wt. % acrylic fiber and from about 15 to about 45 wt. % metallic filament, wherein said plied yarn having a helical twist of from 50 to 120 turns per meter and comprising a plurality of twisted yarns having a helical twist of from 50 to 120 turns per meter opposite in direction to the twist direction of the plied yarn.

5. The plied yarn of claim 4 comprising at least two twisted yarns and at least one copper wire.

* * * * *